(12) United States Patent
Church

(10) Patent No.: US 7,338,127 B2
(45) Date of Patent: Mar. 4, 2008

(54) CONVERTIBLE SEAT FOR A BABY BUGGY

(75) Inventor: Graham Church, Northhampton (GB)

(73) Assignee: Armon Ltd, Geneva (CH)

( * ) Notice: Subject to any disclaimer, the term of this patent is extended or adjusted under 35 U.S.C. 154(b) by 292 days.

(21) Appl. No.: 11/235,402

(22) Filed: Sep. 26, 2005

(65) Prior Publication Data

US 2006/0064816 A1 Mar. 30, 2006

(30) Foreign Application Priority Data

Sep. 28, 2004 (GB) ................................. 0421531.5

(51) Int. Cl.
- *B60N 2/00* (2006.01)
- *B60N 2/32* (2006.01)
- *A47C 13/00* (2006.01)
- *A47D 7/00* (2006.01)
- *A47D 13/06* (2006.01)
- *A47D 9/00* (2006.01)

(52) U.S. Cl. .................... 297/354.13; 297/118; 5/93.2; 5/102

(58) Field of Classification Search ............... 297/16.1, 297/316, 354.13, 250.1, 130; 5/655, 102, 5/93.2; 280/35, 657
See application file for complete search history.

(56) References Cited

U.S. PATENT DOCUMENTS 1,812,699 A * 6/1931 Hursh ........................... 5/102
3,971,079 A * 7/1976 Fleischer ....................... 5/97
4,116,465 A * 9/1978 Maclaren .................. 280/647
2001/0015569 A1* 8/2001 Wilkins et al. ......... 297/354.13

FOREIGN PATENT DOCUMENTS

| EP | 1031490 A1 * | 8/2000 |
| GB | 2163045 A * | 9/1985 |
| WO | WO 9416603 A1 * | 8/1994 |

\* cited by examiner

*Primary Examiner*—George B. Nguyen
*Assistant Examiner*—Kaitlin A Wilson
(74) *Attorney, Agent, or Firm*—Andrew Wilford

(57) ABSTRACT

A child support for a buggy which is convertible between seat and cot configurations, having upper and a lower matching frames, two panels, and a stretcher, the first panel being hinged to one end of the lower frame, the stretcher being hinged to the other end of the upper frame, and the second panel being hinged to the first panel and the stretcher, wherein in the seat configuration the upper and lower frames lie on top of one another, the first and second panels are at an angle, and the stretcher is parallel to the plane of the frames, and in the cot configuration the frames are spaced apart from one another, the first and second panels are parallel to the plane of the lower frame, and the stretcher extends between the upper and lower frame.

5 Claims, 2 Drawing Sheets

CONVERTIBLE SEAT FOR A BABY BUGGY

FIELD OF THE INVENTION

The present invention relates to baby buggies, in particular baby buggies having a 2-in-1 seat and cot unit.

BACKGROUND OF THE INVENTION

There are many different designs of baby buggies, but usually they consist of a frame having a seat or cot supported on the frame. It is recommended that newborn babies lie flat in a buggy. Therefore buggies for newborn babies have a cot or bassinet, having a flat bed on which to place the baby. The cot has upright sides to prevent the baby from falling out. Buggies having cots or bassinets are often referred to as prams. As a child grows older it is desirable for the child to be seated in an upright position. Therefore buggies are provided with seats, which usually include a backrest and seat cushion, supporting the child in an upright position. Often the inclination of the seat back can be changed, so that the child can recline in the buggy. Some buggies have means for interchangeably receiving a cot or an upright seat. These are known as travel system buggies.

SUMMARY OF THE INVENTION

According to the invention, there is provided a child support for a buggy which is convertible between seat and cot configurations, having:
  upper and a lower matching frames,
  two panels, and
  a stretcher, the first panel being hinged to one end of the lower frame, the stretcher being hinged to the other end of the upper frame, and the second panel being hinged to the first panel and the stretcher, wherein:

in the seat configuration the upper and lower frames lie on top of one another, the first and second panels are at an angle, and the stretcher is parallel to the plane of the frames;

and in the cot configuration the frames are spaced apart from one another, the first and second panels are parallel to the plane of the lower frame, and the stretcher extends between the upper and lower frame.

When the child support is in use as a cot or seat, the weight of the child is supported on the first and second panels, but not on the stretcher. However, the stretcher behaves much as the panels, and is preferably a panel, like the first and second panels.

BRIEF DESCRIPTION OF THE DRAWINGS

A child support embodying the invention will now be described, by way of example, without limitation to the scope of the invention, and with reference to the drawings, in which.

DESCRIPTION OF THE PREFERRED EMBODIMENT

Figure 1:
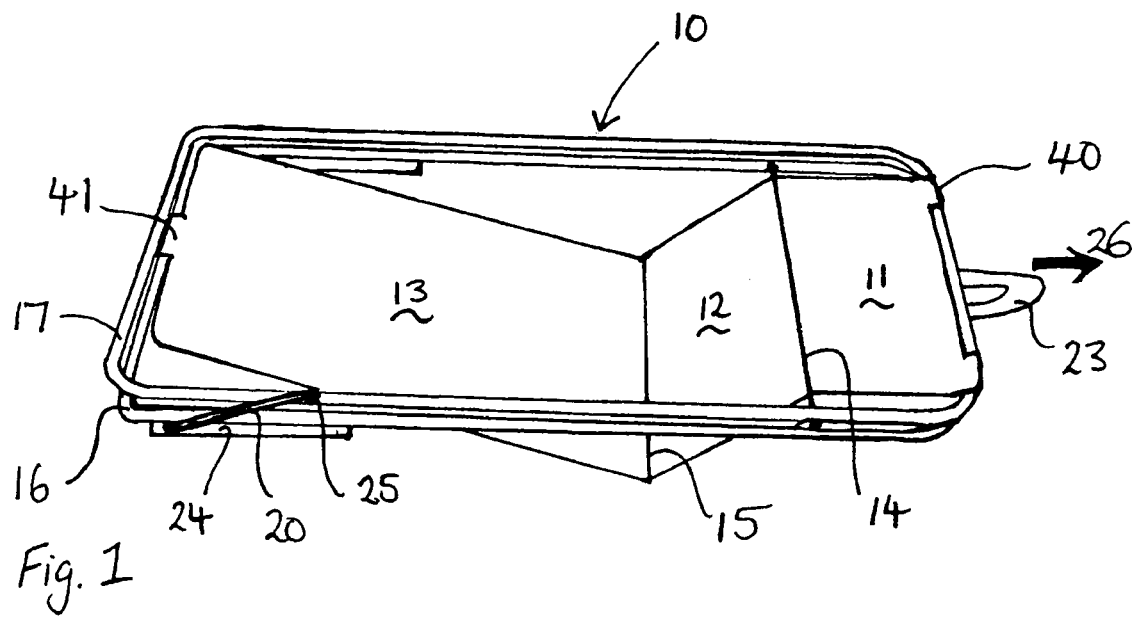
FIG. 1 is a perspective view of the child support in the seat configuration.

FIG. 1 shows the child support 10 in the seat configuration. It is shown flat, though it will be upright when in use as a child seat. The child support 10 comprises three panels 11, 12, and 13. Panel 11 is coupled to panel 12 via hinge 14, and panel 12 is coupled to panel 13 via hinge 15. Panel 13 is attached to panel 12 at an angle, the angle being between 0° and 180°, and preferably around 90-120°. In this configuration, the three panels 11, 12, and 13 form the panels of a child seat, 13 being the back rest, 12 being the base of the seat, and 13 being the leg rest. The panels 11-13 are made of a stiff material, such that they keep their shape when in use. The panels may be padded so that the child support is comfortable for a child to sit or lie in.

The seat panels 11-13 are supported within a rectangular support frame consisting of an upper rectangular frame 17 and a lower rectangular frame 16. Each frame has the same dimensions and is comprised of a pair of opposing side bars, connected via shorter, opposing end bars. In the seat configuration, the rectangular frames lie adjacent to one another, with the side bars and end bars of upper frame 17 lying directly on top of the corresponding bars of lower frame 16.

The bottom edge of panel 11 (ie. the bottom edge of the seat when the seat is upright) is hingedly coupled to one of the short edges of upper frame 17 via hinge 40. The top edge of panel 13 (ie. the top of the seat) is coupled to the opposing short edge of lower frame 16, via hinge 41.

Figure 2:
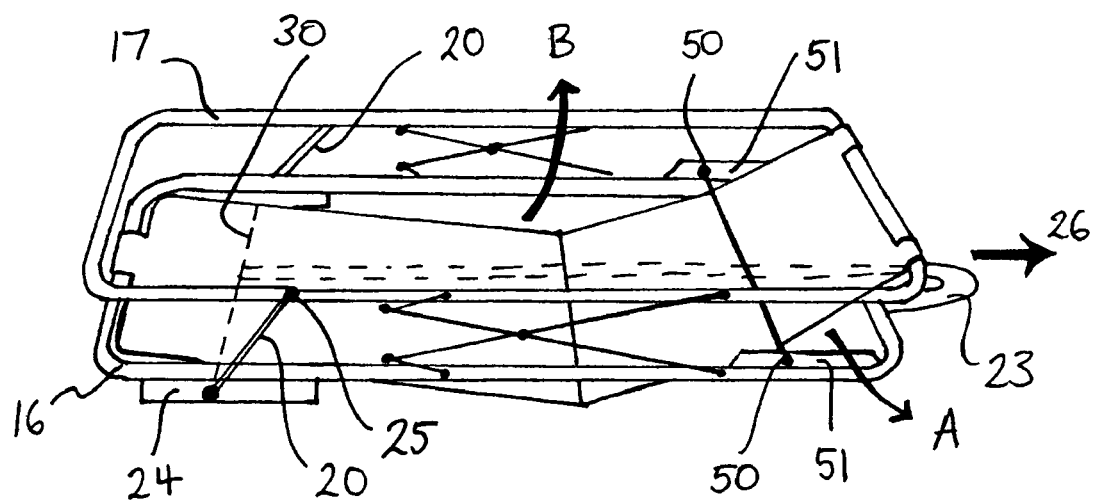
FIG. 2 is a perspective view of the child support being converted from a seat to a cot.
Figure 3:
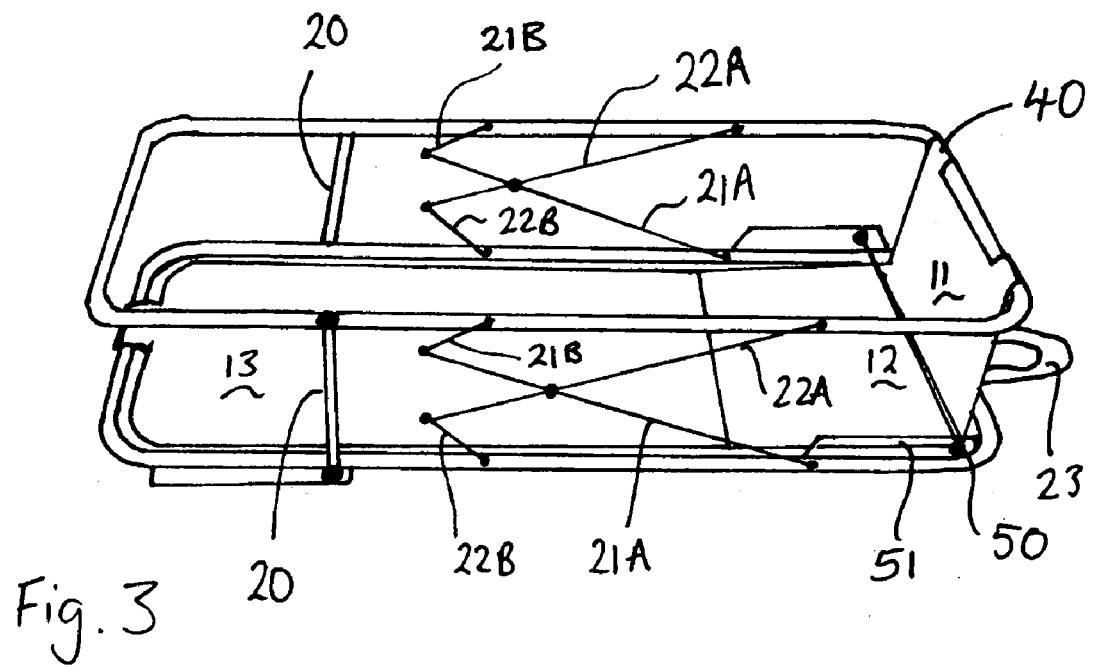
FIG. 3 is a perspective view of the child support in the cot configuration.

To convert the seat into a cot, the upper frame 17 can be moved upwards, away from the lower frame 16, as shown in FIGS. 2 and 3. On each of the long sides of the support frame, the upper frame 17 is coupled to the lower frame 16 via cross struts 20, 21, and 22 (visible in FIGS. 2 and 3).

Referring to FIG. 2, the face of the child support nearest the viewer will now be described; the opposite face, as shown in the figures, is identical. Cross bar 20 is coupled at its lower end to a slide 24, which is attached to lower frame 16, the axis of the slide 24 running parallel to the long edge of frame 16. The cross bar 20 is hinged to upper frame 17 at pivot 25. The two cross bars 20 are coupled by a horizontal bar 30, joining the lower ends of the two cross bars. The horizontal bar 30 is located underneath the seat panel 13, and is shown in FIG. 2 by a broken line.

A strap 23 is attached to bar 30, and runs underneath the panels 11-13 (as shown in broken lines in FIG. 2) with its end protruding at the right as shown. To convert the child support from the seat configuration to the cot configuration, the strap 23 is pulled in the direction of arrow 26. When the strap 23 is pulled, the horizontal bar 30 moves in the direction of arrow 26, and causes the lower ends of the two cross bars 20 to move along the slides 24. Each of the cross bars 20 therefore pivots about pivot point 25, in the direction of arrow 26, and in turn causes the upper frame 17 to be lifted upwards, away from lower frame 16. Parallel motion means are provided between the upper and lower frames, preventing relative motion in any direction other than the vertical direction. The parallel motion means is provided by cross struts 21A, 21B, 22A, and 22B, as shown in FIG. 3.

In this embodiment the cross bars 20 are located at one end of the long edge of the child support, but the cross bars 20 may of course be located at any point along the long edge of the child support. For example, the cross bars 20 may be located at the mid point along each of the long sides of the child support, the long sides each having a pair of parallel motion means, one at the top end of each long side and one at the bottom end.

Whilst the strap 23 is being pulled, each cross bar 20 will move along its slide 24, until it reaches the end of the slide (ie. the configuration shown in FIG. 3). The length of each slide 24 should be roughly equal to the length of each cross bar 20, such that whilst pulling the strap 23, when the lower end of each cross bar 20 reaches the end of the slide, each cross bar 20 will be substantially vertical. Therefore when the child support is in use as a cot ("the cot configuration"), compressive forces will be exerted on the substantially vertical cross-bars 20, and the cross bars 20 will act to support upper frame 17.

Referring to FIG. 2, as upper frame 17 is moved away from lower frame 16, the bottom seat panel 11 (the leg rest) pivots downwards about hinge 40, in the direction of arrow A. The top panel 13 (the back rest) pivots about hinge 41, upwards in the direction of arrow B. At each end of hinge 14, there is a protrusion 50, which extends away from the hinge in the direction of the hinge axis. Each protrusion 50 is engaged in a slide 51. Each slide 51 is attached to lower frame 16, and runs parallel to the long axis of the frame. Whilst the seat is being converted from a seat to a cot, and vice versa, each of the hinge protrusions 50 is confined to move along the slides 51. In this way panel 11 is locked in place, parallel with the plane of the frame when the child support is in the seat configuration.

Referring to FIG. 3, in the cot configuration, the bottom seat panel 11 is now suspended vertically from hinge 40. Panel 11 is locked in place, in the plane of the cot sides, due to the engagement of the protrusions 50 in the slides 51. The length of panel 11 along the long axis of the seat/cot is equal to the length of each cross bar 20, so that panel 11 fully covers one end of the cot in the cot configuration. Panel 11 therefore provides strength to the cot structure.

In the cot configuration, panels 12 and 13 are co-planar and form a horizontal, flat base for the cot and panel 11 forms an end wall of the cot. There may be fabric attached between frames 16 and 17, to form the other 3 side walls of the cot. The fabric should be flexible, so that it folds, or concertinas down, when the child support is in the seat configuration. A baby can be placed to lie flat on panels 12 and 13.

To convert the cot to a seat, the user can apply downward pressure to seat panel 12 or 13 in the vicinity of the hinge 15. When downward pressure is applied to panel 13, the panel pivots downwards, about hinge 41. Since panels 11-13 are hinged together, end to end, the movement of panel 13 causes panels 11 and 12 to pivot about their respective hinges, and return to the seat configuration. Other methods may be used to convert the cot to a seat.

Figure 4:
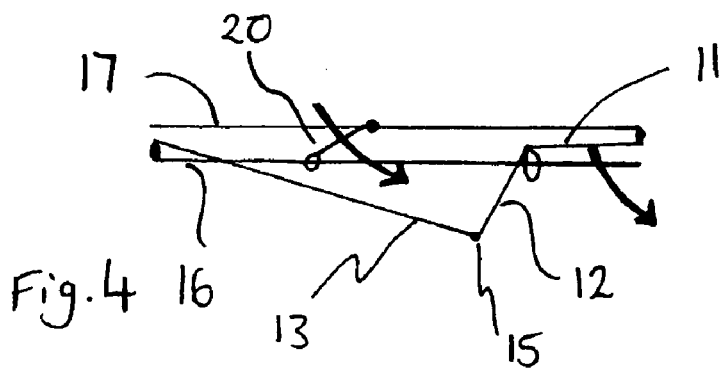
FIG. 4 is a diagrammatic side view of the child support in the seat configuration.
Figure 5:
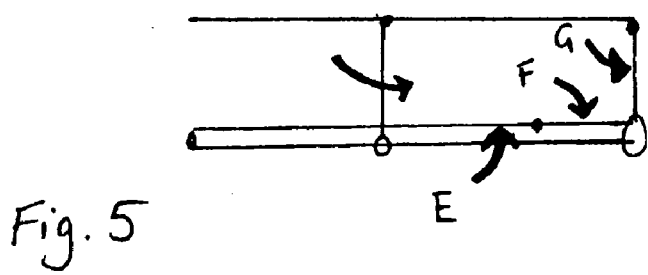
FIG. 5 is a diagrammatic side view of the child support in the cot configuration.

FIGS. 4 and 5 show the seat and cot configurations respectively, in a simplified diagrammatic form. The reference numerals used in FIGS. 1-3 have been used in FIGS. 4 and 5 to identify the same elements as in FIGS. 1-3. Arrows E, F, and G show the movements made by panels 13, 12 and 11 respectively, in converting from the seat configuration to the cot configuration.

The child support may include spring damping mechanisms to dampen the movement during the cot-seat conversion. Releasable locking means may be employed to lock the child support in the cot configuration and seat configuration.

An advantage of the present invention is that the child support can be converted from a seat to a cot via a single pull action. The child support can similarly be converted from a cot to a seat also in a single action.

Alternative embodiments using the principles disclosed will suggest themselves to those skilled in the art upon studying the foregoing description and the drawings. It is intended that such alternatives are included within the scope of the invention, which is limited only by the claims.

What I claim is:

1. A child support for a buggy which is convertible between seat and cot configurations, having:
    upper and a lower matching frames,
    two panels, and
    a stretcher,
the first panel being hinged to one end of the lower frame, the stretcher being hinged to the other end of the upper frame, and the second panel being hinged to the first panel and the stretcher, wherein:
in the seat configuration the upper and lower frames lie on top of one another, the first and second panels are at an angle, and the stretcher is parallel to the plane of the frames; and in the cot configuration the frames are spaced apart from one another, the first and second panels are parallel to the plane of the lower frame, and the stretcher extends between the upper and lower frame.

2. A child support according to claim 1 wherein the stretcher is a panel.

3. A child support according to claim 1 including a rod means slidably coupled to one of the frames and pivotally coupled to the other frame, such that when the rod is caused to slide along the said one frame, the two frames are caused to move apart.

4. A child support according to claim 3 wherein the rod means comprise two rods, one on each side, the rods being coupled by a bar which is attached to each rod at its lower end, and having a strap attached to the bar such that when the strap is pulled, the rods are caused to slide along the lower frame.

5. A child support according to claim 1 wherein there are two parallel motion means attached between the upper and lower frames, one on each side of the child support, each parallel motion means comprising two long bars, each pivotally attached at one end to the lower frame and upper frame respectively, the bars crossing over each other and being pivoted to each other at the cross-point, and the other end of each bar being pivotally attached to a short bar, pivotally attached to the upper frame and lower frame respectively.

* * * * *